United States Patent [19]

McCarthy et al.

[11] Patent Number: 4,470,947
[45] Date of Patent: Sep. 11, 1984

[54] DOUBLE-CLAD NUCLEAR FUEL SAFETY ROD

[75] Inventors: William H. McCarthy, Los Altos; Donald B. Atcheson, Cupertino; Swaminathan Vaidyanathan, San Jose, all of Calif.

[73] Assignee: The United States of America as represented by the United States Department of Energy, Washington, D.C.

[21] Appl. No.: 335,995

[22] Filed: Dec. 30, 1981

[51] Int. Cl.³ ............................ G21C 3/02; G21C 3/18
[52] U.S. Cl. ............................ 376/213; 376/336; 376/412; 376/416; 376/420
[58] Field of Search ............... 376/213, 336, 416, 417, 376/428, 412, 420

[56] References Cited

U.S. PATENT DOCUMENTS

| | | | |
|---|---|---|---|
| 2,952,600 | 9/1960 | Newson | 376/432 |
| 3,053,743 | 9/1962 | Cain, Jr. | 376/420 |
| 3,087,879 | 4/1963 | Walker et al. | 376/420 |
| 3,088,898 | 5/1963 | Busby et al. | 376/329 |
| 3,115,453 | 12/1963 | Paget et al. | 376/336 |
| 3,125,493 | 3/1964 | D'Amore | 376/420 |
| 3,145,149 | 8/1964 | Imhoff | 376/428 |
| 3,274,067 | 9/1966 | Greebler et al. | 376/420 |
| 3,282,741 | 11/1966 | Pigford et al. | 376/420 |
| 3,291,699 | 12/1966 | Trickett et al. | 376/420 |
| 3,291,700 | 12/1966 | Brossa et al. | 376/417 |
| 3,335,064 | 8/1967 | Whittaker et al. | 376/327 |
| 3,427,222 | 2/1969 | Biancheria et al. | 376/420 |
| 3,466,226 | 9/1969 | Lass | 376/420 |
| 3,510,398 | 5/1970 | Wood | 376/327 |
| 3,519,536 | 7/1970 | Rausch | 376/243 |
| 3,671,393 | 6/1972 | Williams | 376/412 |
| 3,679,545 | 7/1972 | Leirvik | 376/420 |
| 3,734,825 | 5/1973 | Schaburt et al. | 376/224 |
| 3,740,314 | 6/1973 | Neimark | 376/420 |
| 3,795,580 | 3/1974 | Schively | 376/336 |
| 3,975,233 | 8/1976 | Wewde | 376/333 |
| 3,981,598 | 9/1976 | Taulier et al. | 376/336 |
| 4,073,684 | 2/1978 | Cepkauskas | 376/233 |
| 4,076,587 | 2/1978 | Taulier et al. | 376/336 |
| 4,111,748 | 9/1978 | Hayashi et al. | 376/412 |
| 4,138,320 | 2/1979 | Granz | 376/337 |
| 4,167,443 | 9/1979 | Noyes et al. | 376/233 |

Primary Examiner—Sal Cangialosi
Attorney, Agent, or Firm—L. E. Carnahan; Roger S. Gaither; Michael F. Esposito

[57] ABSTRACT

A device for shutting down a nuclear reactor during an undercooling or overpower event, whether or not the reactor's scram system operates properly. This is accomplished by double-clad fuel safety rods positioned at various locations throughout the reactor core, wherein melting of a secondary internal cladding of the rod allows the fuel column therein to shift from the reactor core to place the reactor in a subcritical condition.

15 Claims, 2 Drawing Figures

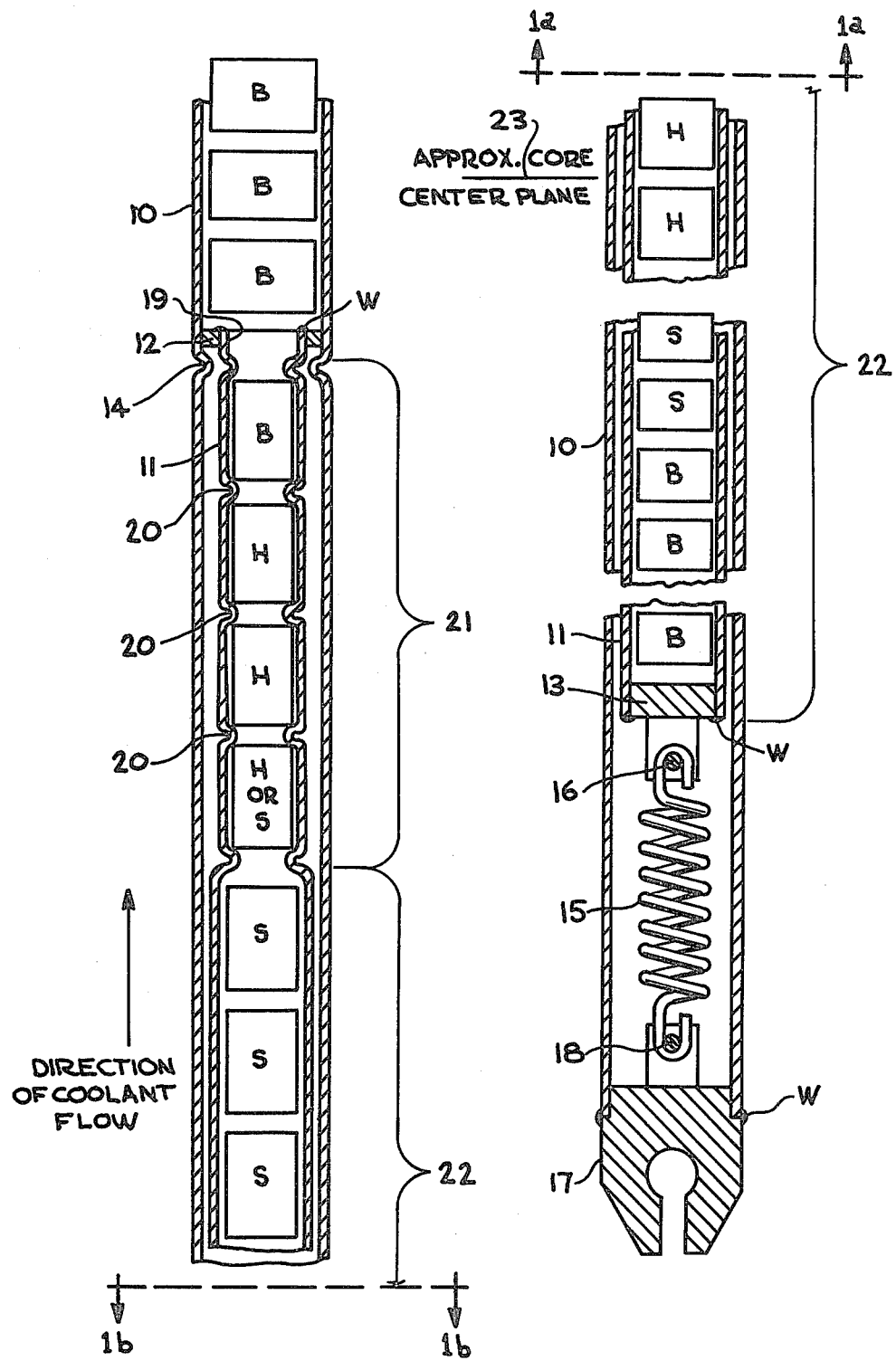

DOUBLE-CLAD NUCLEAR FUEL SAFETY ROD

BACKGROUND OF THE INVENTION

The Government has rights in the invention described herein which arose under Contract No. DOE-ATO3-76SF71031 between the U.S. Department of Energy and General Electric Company.

The invention is directed to nuclear reactor safety devices, particularly to such devices for shutting down a nuclear reactor, and more particularly to a nuclear fuel safety rod for shutting down a reactor during an undercooling or overpower event.

The use of control or shutdown systems to regulate the reactivity of a nuclear reactor by varying the location of control rods with respect to the reactive core is well known. These reactor control or shutdown devices generally utilize control rods which contain neutron poisons to control the reactivity of the core. Such prior shutdown systems are exemplified by U.S. Pat. No. 4,138,320 issued Feb. 6, 1979, to A. L. Grantz, which utilizes a fluidic self-actuating control assembly which is activated in response to either an undercooling or an increase in the neutron flux activity in the reactor core. U.S. Pat. No. 4,076,587 issued Feb. 28, 1978, to H. H. L. Taulier et al utilizes a fuse-type construction for the emergency shutdown system wherein melting of the fuse causes the lowering of boron carbide masses into the core, which results in reactor shutdown. U.S. Pat. No. 3,795,580, issued Mar. 5, 1974, to D. P. Schively, utilizes a shutdown device which depends on the melting down of an elongated neutron absorber containing capsule within a core duct. In addition, various types of control rods have been developed to more effectively control or shut down a reactor under emergency conditions. Such control rods are exemplified by U.S. Pat. Nos. 3,087,879, issued Apr. 30, 1963, to D. E. Walker et al, and 3,088,898, issued May 7, 1963, to T. S. Busby et al.

While the prior shutdown systems are effective, increased costs and decreased reliability are involved due to the activation mechanisms required. Thus, recent efforts have been directed to the passive-type shutdown systems which function on well-known physical principles, and no intervention by human or automatic systems is required to place the reactor in subcritical (shutdown or "scram") condition.

Accordingly, it is an object of the present invention to provide a passive reactor shutdown device.

A further object of the invention is to provide a reactor shutdown device involving a fuel safety rod.

Another object of the invention is to provide a fuel safety rod wherein an inner cladding which normally retains the fuel is melted by an undercooling or overpower event thus causing the fuel to shift to produce a subcritical condition in the reactor core.

Another object of the invention is to provide a double-clad nuclear fuel safety rod wherein the inner cladding is broken or melted due to abnormal operating conditions causing reactor shutdown.

SUMMARY OF THE INVENTION

The above objects of the present invention are carried out by providing a fuel safety rod for nuclear reactors having an inner cladding which retains the fuel under normal operating conditions, but melts or breaks under overpower or undercooling conditions, allowing the fuel to shift within the reactor core to produce a subcritical condition resulting in reactor shutdown.

The double-clad nuclear fuel safety rod of the present invention is similar to the normal fuel rods, except that it incorporates:

(1) an inner cladding;
(2) supporting members at each end;
(3) some high-enrichment fuel pellets; and
(4) a spring assembly attached at one end of the inner cladding. Upon melting of the inner cladding, the spring assembly causes a shift of the fuel pellets within the rod, resulting in a change in the criticality of the reactor core.

DESCRIPTION OF THE DRAWING

FIGS. 1a and 1b illustrates an embodiment of a double-clad nuclear fuel rod in accordance with the invention.

DETAILED DESCRIPTION OF THE INVENTION

The present invention is a fuel safety rod or pin which functions to shut down (scram) a nuclear reactor in the event that an overpower or undercooling incident is not terminated by the primary shutdown system or any other control rod action. The safety rod functions entirely passively, based on well-known physical principles, and no intervention by human or automatic systems is required to place the reactor core in a subcritical condition. Utilizing the invention, the reactor shutdown occurs before an undercooling or overpower transient can cause fuel or cladding melting in the normal fuel assemblies. This invention will produce timely reactor shutdown at all reactivity insertion rates, including those that are too fast to be controlled by inherently safe back-up shutdown systems. Based on calculations and information currently available, the fuel safety rods of the invention will be used in 10% or less of the sub-assemblies in a reactor and the sub-assemblies in which the rods are used will contain 25% to 100% rods of the invention, the standard fuel rods being used for the remainder of the sub-assemblies. Thus, a substantial safety feature is achieved with a minimum cost increase and with a minimum penalty with regard to placing neutron-absorbing materials in the reactor core. The safety rod of the invention is principally directed toward core-wide undercooling or overpower events, without the scram system operating; but it will also function with somewhat more localized events to terminate reactor operation when partial, as well as whole-core, power and coolant flow excursions occur.

An embodiment of the invention is illustrated in the drawings. The fuel safety rod illustrated and described to exemplify the invention is for a sodium-cooled, fast-neutron reactor, using stainless steel cladding and $(U,Pu)O_{2-x}$, plutonium-uranium fuel pellets. However, the invention could be utilized by other types of reactors, including water-moderated and gas-cooled reactors that do, or could, employ the fuel safety rods, simply by changing materials and dimensions to be compatible with a specific type of reactor. Those skilled in the art will, from the example set forth hereinafter, be able to make the necessary change to utilize the inventive concept in other reactor systems.

Normal fuel rods are simply a stack of fuel pellets 4–20 mm in diameter, encased in a cladding tube sealed at both ends by end plugs, at least one of which is configured to attach to supporting structure. Sometimes blanket pellets (fertile material) are added at the ends of the fuel column. A plenum space is always provided at one or both ends of the fuel/blanket column to accommodate fission gas (Xe and Kr) that is emitted by the fuel during irradiation.

The double-clad nuclear fuel safety rod of the present invention is generally similar to the normal fuel rod from an external appearance, but has been modified internally to accomplish the purposes of the invention.

Referring now to the embodiment illustrated in the drawing, the fuel safety rod, like the normal fuel rod, is encased by an outer tube or cladding indicated at 10, of material such as type 316 cold-worked stainless steel. However, a stronger and/or higher melting temperature outer cladding can be used for specific applications. Located within and extending longitudinally along a portion of the outer cladding 10 is an inner tube or cladding 11 which is secured at the upper end, as shown, to a supporting washer or ring 12 of larger external diameter than cladding 11, and at the lower end to a metallic mushroom or T-shaped member 13. Inner cladding 11 is secured via weld points W to washer 12 and mushroom 13. Outer cladding 10 is swaged at 14 to fix the axial position of washer 12, and hence the fuel column, when the inner cladding 11 is inserted into the outer cladding 10. The inner cladding 11 is retained within outer cladding 10 via a spring 15 secured to mushroom 13 at one end by a pin or other device 16 and to a bottom end plug 17 via a pin or other device 18. Outer cladding 10 is secured to plug 17 via weld points W. Washer 12 and mushroom 13 may be constructed of Monel or other known metallic material compatible with the environment. The spring 15 is constructed, for example, of Inconel with pins 16 and 18 constructed of similar material. Spring 15 is of the tension type, designed to provide a force of about 10–70 lbs ($\sim$6-inch free length stretched to $\sim$24 inches) in normal operation.

The inner cladding 11 preferably has a somewhat lower melting temperature than outer cladding 10, although certain embodiments of the invention would operate using a material having the same or a slightly higher melting temperature than the outer cladding material. However, the melting temperature of the inner cladding, and its relationship to that of the outer cladding, is an important aspect, as will be explained hereinafter. In the embodiment illustrated, Monel is utilized as the inner cladding material (the solidus temperature of type 316 stainless steel outer clad is about 1370° C. and the liquidus temperature of Monel is about 1350° C.). Precipitation-hardened Monel K could be substituted for greater strength. The supporting washer 12 and the mushroom-shaped member 13 are normally of the same material as the inner cladding 11 to facilitate fabrication and assembly (welding, etc.).

Within the inner cladding or tube 11 are located a plurality of fuel-containing pellets and blanket-material pellets. In the embodiment illustrated, the fuel pellets S are of standard pellet composition (e.g., 20% Pu/U mixed oxide, and/or mixed carbide, and/or mixed nitride), while the fuel pellets H are highly enriched (e.g., 40% Pu/U mixed oxide). The blanket pellets B are of $UO_2$. As shown in the illustrated embodiment, the inner cladding 11 contains one upper blanket pellet B; all of the fuel pellets S and H; and all of the lower blanket pellets B; the remaining upper-blanket pellets B being retained in outer cladding 10 above washer 12. The washer 12 is provided with an opening 19 which allows fission gas to escape into outer cladding 10 wherein it is contained, as known in the art. To constrain the axial positions of the upper highly-enriched fuel pellets H and/or a portion of the standard fuel pellets S, the inner cladding 11 is swaged, as indicated at 20. Also, as shown, the upper section of the inner cladding 11, indicated at 21, can be of reduced diameter (for example, 0.01–0.08 mm less) compared to the lower section 22 of inner cladding 11 (to adjust the heat transfer through the gas-filled annulus). The fuel safety rod is completed by filling with appropriate gas, such as He or Ar, as known in the art.

In normal operation, the fuel safety rod of the invention is positioned in a reactor core with coolant following upwardly, as indicated in the drawing, and will behave externally in a way typical of the standard fuel rods not containing the inner cladding. Power generation produced by the rod may be slightly less than that of the standard fuel rod because the fuel pellets are smaller to accommodate the added inner cladding; but this may be partially or completely compensated for by increasing the fissile enrichment of the fuel pellets. The smaller pellet size and higher enrichment produce faster thermal response than normal (standard) fuel pellets. Breeding performance will be slightly degraded. These detriments are small, however, because only a relatively few fuel safety rods are included in any reactor core. In a fast reactor, the standard fuel rods contain a long plug (half-meter, or so) of a nickel alloy to act as a shield of the reactor core support structure from the fast neutron flux. In the double-clad nuclear fuel safety rods, these plugs must be largely or completely replaced by the spring between the inner cladding and the bottom end plug. Because only a few sub-assemblies will contain the fuel safety rods, such lack of shielding is not a serious deficiency, and it can be at least partially compensated for by adding mass to the bottom portion of the sub-assembly hardware.

During a serious overpower or undercooling incident, the inner cladding 11 of the fuel safety rod will melt at section 21 thereof, near the upper set of high-enrichment fuel pellets H, well before the outer cladding 10 of the rod melts and also well before any cladding melting of any standard fuel rod in the reactor core. The weight of the fuel column (pellets S and H), augmented by the tension in the spring 15, will propel the fuel column downward. Since much less than a 1% removal of fuel in a reactor core will serve to establish a subcritical condition, the melting of the inner cladding in only a relatively few safety rods will shut off the nuclear fission reactions, causing shutdown (scram) of the reactor. No outside intervention is needed to turn off the power to the state that only residual heat removal is required. Thus, the fuel safety rods act as a fuse to prevent serious damage to the standard fuel assemblies, and especially to make impossible a core meltdown and consequent breach of the primary system vessel.

While the above description relates to the melting of the inner cladding, it is not necessary that the inner cladding actually change phase from solid to liquid, but only that it become weak enough so that the force of the spring plus the weight will part (break) the inner cladding. The temperature at which this weakness occurs can be a few degrees below the physical melting temperature.

The inner cladding 11 is crimped (swaged) in section 21 thereof around the upper set of fuel pellets H to prevent any possibility of the inner cladding slipping off of the fuel. The lower set of high-enrichment pellets H is located in section 22 of inner cladding 11 at or near the maximum-fuel-worth axial location (approximate core center plane) of the reactor core indicated at 23. As the inner cladding 11 moves downward, the upper set of high-enrichment pellets H causes a positive insertion of reactivity. The lower set of pellets H is located axially and given an enrichment such that negative reactivity will be inserted to compensate for that inserted by the upper set of pellets H when the inner cladding moves downward. The lower set of pellets H may have more pellets of slightly lower enrichment than the upper set.

The double-clad fuel safety rod of the present invention provides great flexibility for use by reactor physicists and design engineers. The outer and inner cladding materials can be varied to provide earlier or later transient termination. The gap thicknesses and fill gasses can also be varied, as well as the relative enrichment in various axial zones of the rod, to make trade-off decisions among absolute reliability, producibility, economics, shielding, speed of response, breeding ratio, allowable fluence, and so forth. All that is necessary for functional design is that the inner cladding be completely melted or broken at some axial location (considering circumferential temperature gradients) at the selected point in time during the overpower or undercooling transient, and before the outside cladding has lost its integrity at any point. Some designs may even use inner claddings with higher melting temperature than the outer cladding because the design can be modified to provide differences between the claddings of several hundred degrees centigrade (the inner cladding will always be hotter than the outer cladding because heat flow can only be from the inside out). The safety rod design can be adjusted so that it will respond more to undercooling than to overpower, or alternatively the reverse. The safety rods can be utilized in any reactor using fuel rods, but are especially important in fast reactors. In a water-moderated reactor, an overpower or undercooling condition could conceivably cause the water to boil away. This has the same effect as the operation of the safety rods of this invention because the moderating effect of the water in the thermal reactor is absolutely required to maintain the nuclear criticality. In the fast reactor there is very little moderating effect of the coolant, and its boiling away may even have a positive reactivity effect. Thus, the double-clad nuclear fuel safety rods of the present invention will improve the inherent (geometric) safety design of fast reactors to be equivalent to the water-moderated case, with the advantage that the capability to cool the fuel rods is not lost, even temporarily.

It has thus been shown that the invention provides a double-clad nuclear fuel safety rod for shutting down a nuclear reactor during undercooling or overpower events, whether or not the reactor's scram system operates properly. This is simply accomplished by melting the inner cladding which normally restrains the fuel column and allows it to drop by gravitational forces, thereby changing (reducing) the reactivity of the reactor core. The fuel safety rod can be modified, as pointed out above, for use in different types of reactors, and for different operational events.

While the specific embodiment of the invention has been described and illustrated, modifications will become apparent to those skilled in the art, and it is intended to cover in the appended claims all such modifications as come within the scope of the invention.

What is claimed is:

1. A double-clad nuclear fuel safety rod comprising:
   an outer cladding operatively connected to an end plug,
   an inner cladding positioned within and extending along a longitudinal section of said outer cladding and spaced therefrom,
   means including tension producing means for retaining said inner cladding within said outer cladding,
   said inner cladding containing at least nuclear fuel pellets,
   whereby an undercooling and/or overpower event causes breaking and/or melting of said inner cladding allowing said fuel pellets to shift location within an associated reactor core, thereby reducing the reactivity thereof.

2. The nuclear fuel safety rod of claim 1, wherein said inner cladding is constructed of material having a lower melting point than said outer cladding.

3. The nuclear fuel safety rod of claim 1 wherein said means for retaining said inner cladding within said outer cladding includes a first member having an aperture therein secured to one end of said inner cladding, a second member secured to an opposite end of said cladding, and a spring operatively connected to said second member and to said end plug, said first member being retained by a swaging in said outer cladding.

4. The nuclear fuel safety rod of claim 1, wherein said nuclear fuel pellets consist of a plurality of highly-enriched fuel pellets and a plurality of standard fuel pellets.

5. The nuclear fuel safety rod of claim 4, additionally including a plurality of blanket pellets located at opposite ends of said fuel pellets.

6. The nuclear fuel safety rod of claim 4, wherein said inner cladding is swaged adjacent at least a portion of said fuel pellets to prevent axial movement thereof.

7. In a nuclear fuel rod including a tubing operatively connected at one end to an end plug and containing a plurality of fuel and blanket pellets therein, the improvement comprising:
   an inner cladding positioned within and extending along a portion of said tubing,
   said inner cladding being spaced from said tubing,
   said fuel pellets being located entirely within said inner cladding,
   means for axially retaining one end of said inner cladding within said tubing, and
   means including tension producing means operatively connecting an opposite end of said inner cladding to said end plug.

8. The improvement of claim 7, wherein said first-mentioned means consists of a washer-shaped member secured to said one end of said inner cladding and positioned adjacent a swaged area of said tubing.

9. The improvement of claim 8, wherein said second-mentioned means consists of a mushroom-shaped member secured to said opposite end of said inner cladding, and a spring under tension operatively connected between said mushroom-shaped member and said end plug.

10. The improvement of claim 9, wherein said inner cladding, said washer-shaped member and said mushroom-shaped member are each constructed of the same material.

11. The improvement of claim 7, wherein said fuel pellets consist of a plurality of highly-enriched fuel pellets and a plurality of standard fuel pellets.

12. The improvement of claim 11, wherein said highly-enriched fuel pellets consist of about 40% Pu/U mixed oxide, and wherein said standard fuel pellets consist of about 20% Pu/U mixed oxide.

13. The improvement of claim 11, wherein said inner cladding is swaged at a plurality of locations to prevent axial movement of at least a portion of said highly-enriched fuel pellets.

14. The improvement of claim 7, wherein said inner cladding consists of two sections of different diameters, a first of said two sections having a lesser diameter and being connected to said first-mentioned means, and a second of said two sections having a greater diameter and being connected to said second-mentioned means.

15. The improvement of claim 7, wherein said inner cladding contains in sequence along the length thereof at least one blanket pellet, all of said fuel pellets, and a plurality of blanket pellets, and wherein said fuel pellets consist of a plurality of enriched fuel pellets and a plurality of standard fuel pellets.

* * * * *